United States Patent [19]

Kastler

[11] Patent Number: 5,416,410

[45] Date of Patent: May 16, 1995

[54] SENSOR HEAD FOR A MAGNETIC FLUX TRANSMITTER INCLUDING A SLEEVE-SHAPED PERMANENT MAGNET AND A HALL GENERATOR HAVING A COMMON AXIS

[75] Inventor: Ernst Kastler, Bad-Dürrheim, Germany

[73] Assignee: SMS Schloemann-Siemag AG, Villingen, Germany

[21] Appl. No.: 984,744

[22] Filed: Dec. 3, 1992

[30] Foreign Application Priority Data

Dec. 7, 1991 [DE] Germany ............ 41 40 403.3

[51] Int. Cl.⁶ ............ G01P 3/44; G01P 3/488; G01D 5/18
[52] U.S. Cl. ............ 324/174; 324/207.2
[58] Field of Search ............ 324/173, 174, 207.2, 324/207.21, 251, 252; 338/32 H

[56] References Cited

U.S. PATENT DOCUMENTS

| | | | |
|---|---|---|---|
| 4,319,236 | 3/1982 | Brace et al. | 324/207.2 X |
| 4,524,932 | 6/1985 | Bodziak | 324/207.2 X |
| 4,992,734 | 2/1991 | Adachi | 324/207.2 X |
| 4,994,739 | 2/1991 | Honda et al. | 324/207.2 X |
| 5,070,298 | 12/1991 | Honda et al. | 324/207.2 |
| 5,115,194 | 5/1992 | Luetzow et al. | 324/207.2 |

FOREIGN PATENT DOCUMENTS 3638622 5/1988 Germany .

*Primary Examiner*—Gerard R. Strecker
*Attorney, Agent, or Firm*—Anderson Kill Olick & Oshinsky

[57] ABSTRACT

A sensor head for a magnetic flux transmitter is disclosed which permits the manufacture, in series, and a simple mutual alignment, of a sleeve-shaped permanent magnet and, of a Hall generator which is disposed within the permanent magnet. An embodiment is disclosed which provides the disposition of the Hall generator at the end of a finger-shaped extension of a printed circuit board and to allocate a clamping piece, which is pressable into the permanent magnet, to the carrier. The permanent magnet is displaceable, relative to the Hall generator, for the adjustment of an optimum working point of the magnetic flux transmitter. The permanent magnet, however, has a sufficiently tight seating upon the carrier up to the final attachment of the components of the sensor head by means of an adhesive compound.

9 Claims, 4 Drawing Sheets

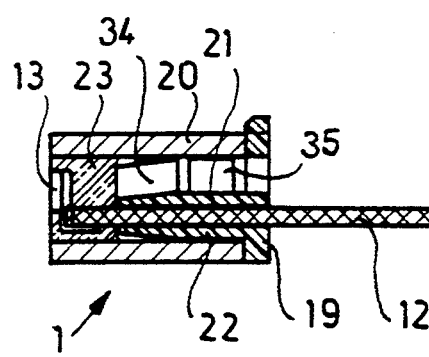
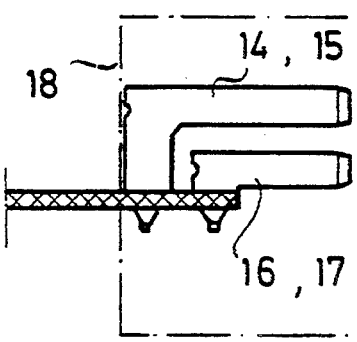
FIG. 2
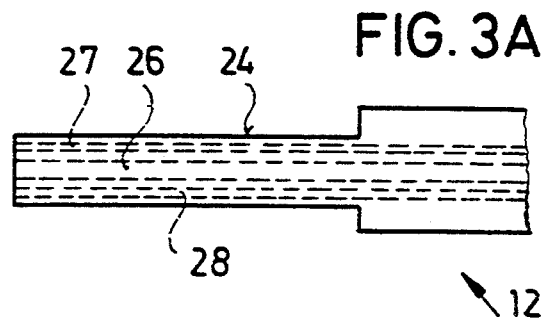
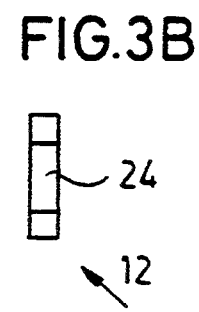
FIG. 3A  FIG. 3B
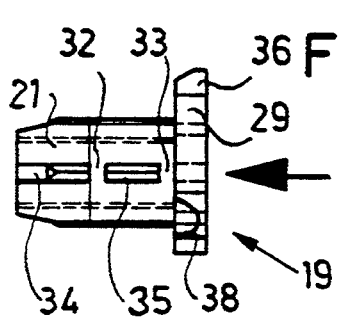
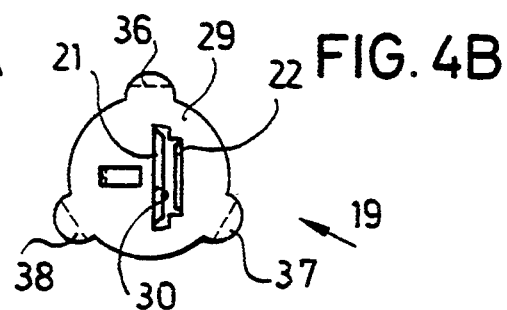
FIG. 4A  FIG. 4B
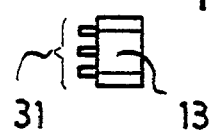
FIG. 5A  FIG. 5B
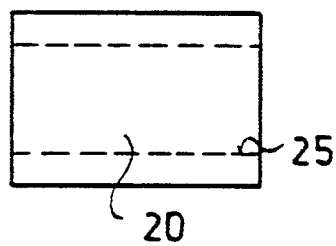
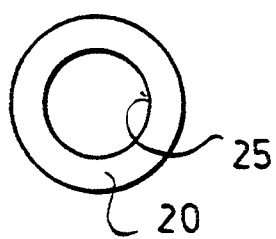
FIG. 6A  FIG. 6B

SENSOR HEAD FOR A MAGNETIC FLUX TRANSMITTER INCLUDING A SLEEVE-SHAPED PERMANENT MAGNET AND A HALL GENERATOR HAVING A COMMON AXIS

FIELD OF THE PRESENT INVENTION

The present invention pertains to a sensor head for a magnetic flux transmitter which has a sleeve-shaped permanent magnet with a Hall generator, fastened on a carrier, which is provided with strip or printed conductors for transmitting signals generated by the Hall generator. The axis of the permanent magnet and the axis of inductance of the Hall generator coincide with one another.

BACKGROUND OF THE PRESENT INVENTION

Magnetic flux generators, which may be transmitters wherein magnetoresistors or "Hall generators" are utilized as active elements, have an advantage compared to inductance transmitters, in that relatively low rpms or movements in the stoppage range may be acquired.

In the prior art, the magnetic flux transmitters, in particular bar-shaped transmitters, with a Hall generator arranged on the end face of a permanent magnet, supply a signal, which is relatively high in comparison with the obtained useful signal and which, because of the wiring pattern of the Hall generator, is temperature-dependent. This signal is further amplified during subsequent processing of the signal which is a significant drawback from measuring technology point of view.

A magnetic flux transmitter has become known from the DE-B 36 38 622, which improves the technical premises of such a bar-shaped magnetic flux transmitter, and especially, however, it supplies as high a useful signal to interference signal ratio as possible. This magnetic flux transmitter utilizes an annular magnet or a sleeve-shaped magnet as a permanent magnet, the aperture of which is allocated or positioned in such a manner, with respect to the Hall generator, that the axis of inductance of the Hall generator and the axis of the annular magnet essentially coincide with one another and further, that the Hall generator, with the magnetic circuit open, is disposed in a space of minimum magnetic inductance which is formed within the annular magnet through field displacement. Herein, there emerges the advantage, that due to the so-called ohmic zero component of the Hall generator, interference voltage levels, which result from manufacturing tolerances, may be compensated for by magnetically biasing the Hall generator. In this regard, the Hall generator is disposed to be offset with respect to the zone of minimum magnetic inductance.

This zero point compensation constitutes an extraordinarily sensitive positional adjustment between the permanent magnet and the Hall generator, which would cause considerable difficulties in mass production. The solution described in the DE B 36 38 622, wherein a finger-shaped extension is configured in such a manner, at the printed circuit board, that it is introducible into the aperture of the permanent magnet and that the Hall generator is attached at the end side of the printed circuit board extension, for various reasons is unsuitable for mass production. In particular, because of the coarse tolerances, which have to be accepted in the manufacture of the printed circuit board, and because of the considerable shape deviation of such permanent magnets which also have to be tolerated, an unjustifiably expensive mounting for the adjustment and the positional fixation for the subsequent solid connection of the permanent magnet, with the printed circuit board extension, becomes necessary.

SUMMARY OF THE PRESENT INVENTION

The present invention provides a sensor head for a magnetic flux transmitter which is directed toward the task of creating an arrangement for a magnetic flux transmitter, which provides an assembly which is suitable for manufacturing in large series as well as for a simple mutual alignment and positional fixation of a Hall generator and a permanent magnet.

The present invention provides for an apparatus wherein, the carrier, prior to being undetachably connected with the permanent magnet, is insertable into the aperture of the permanent magnet, without any play and in such a manner, that the permanent magnet and the carrier are displaceable relative to one another for adjustment purposes.

According to the preferred embodiment, the magnetic flux transmitter of the present invention comprises a clamping piece, which is pressed into the opening of the permanent magnet and is provided with an opening and flexural cheeks for receiving and retaining the Hall generator carrier formed as a printed circuit board.

In another embodiment of the present invention, the carrier is configured so as to be parallelepiped-shaped, and preferably has a rectangular cross-section. The diagonal of the cross-section is at least equal to the internal diameter of the permanent magnet. Further, contact faces, which serve for the electrical contact of the Hall generator with the conductor strips, are configured on the end face of the carrier.

The apparatus which is the subject of the present invention facilitates the creation of sensor heads, for magnetic flux transmitters, which, as far as electromagnetic matching is concerned, can be manufactured individually, meaning independently of the transmitter housings and the plug-in contact configurations, and possibly, also without the wiring of the transmitters and, thus, are universally usable. Both embodiment examples mentioned are distinguishable over the prior art, in that, in spite of the inevitable coarse tolerances of the components which are utilized, a close sliding fit, in other words, a displaceable interference or pressing fit may exist between the carrier of the Hall generator and the permanent magnet. The apparatus of the present invention, for the assembly and for the necessary sensitivity adjustment of the sensor head, must be designed in a simple manner. In order to attain the subsequent fixation of the functional position by adhesion or by bonding only, a simple receptacle for the vertical positioning of the sensor head is required for series-manufacture due to the existing self-locking feature.

If, according to the one embodiment example, a printed circuit board is provided as a carrier, then it would be advantageous if such a carrier can be manufactured in large series and in a simple and easily-controllable manner. Further, it would also be advantageous if the sensor head can be configured at the same printed circuit board, at which the electrical components, which may be utilized for interference protection and for the wiring of the Hall generator, can be contacted. The clamping piece which is additionally required in this embodiment example can also be fabricated, in an inexpensive manner, as a plastics injection molding part and may have the advantage that relatively coarse tolerances, of the carrier, may be compensated for by having the clamping piece acting in a simple manner like the collar chuck of a machine tool.

In the embodiment example, wherein no additional component is required, the desired close sliding fit between the permanent magnet and the parallelepiped-shaped carrier may be achieved by a certain elasticity of the carrier material and by a shaping, in such a manner, that a material displacement occurs upon assembly. It is particularly advantageous in this solution, that a three-dimensional configuration of the strip conductors or copper paths enable an exclusively end face attachment and contacting of a Hall generator which is configured as a surface mounted device.

Accordingly, it is an object of the present invention to provide a sensor head for a magnetic flux transmitter which provides for an arrangement which permits for an assembly which is suitable for manufacturing in large series as well as for a simple mutual alignment and positional fixation of a Hall generator and a permanent magnet.

It is another object of the present invention to provide a sensor head for a magnetic flux transmitter wherein a carrier, prior to being undetachably connected with the permanent magnet, is insertable into the aperture of the permanent magnet, without any play, and in such a manner, that the permanent magnet and the carrier are displaceable relative to one another for adjustment purposes.

It is yet another object of the present invention to provide a sensor head for a magnetic flux transmitter which facilitates the creation of sensor heads, for magnetic flux transmitters, which, as far as electromagnetic matching is concerned, can be manufactured individually, meaning, independently of the transmitter housings and the plug-in contact configurations and possibly also without the wiring of the transmitters and, thus, are universally usable.

It is yet another object of the present invention to provide a sensor head for a magnetic flux transmitter wherein, in spite of the inevitable coarse tolerances of the components which are utilized, a close sliding fit, or in other words, a displaceable interference or pressing fit exists between the carrier of the Hall generator and the permanent magnet.

Other objects and advantages of the present invention will be made apparent to those persons skilled in the art upon a review of the Description of the Preferred Embodiment taken in conjunction with the Drawings which follow.

BRIEF DESCRIPTION OF THE DRAWINGS

Figure 1:
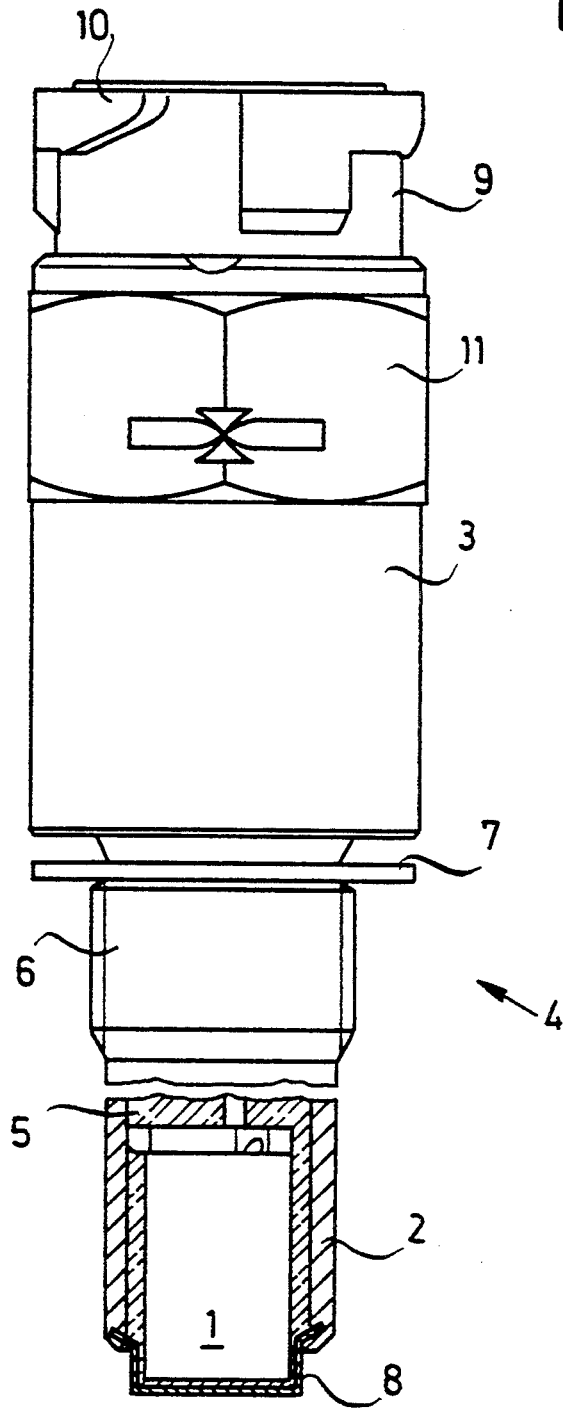

IN THE DRAWINGS:

FIG. 1 illustrates a front view of a magnetic flux transmitter which is the subject of the present invention and which is shown ready for installation, and in a partial section in the region of the sensor head.

Figure 7A:
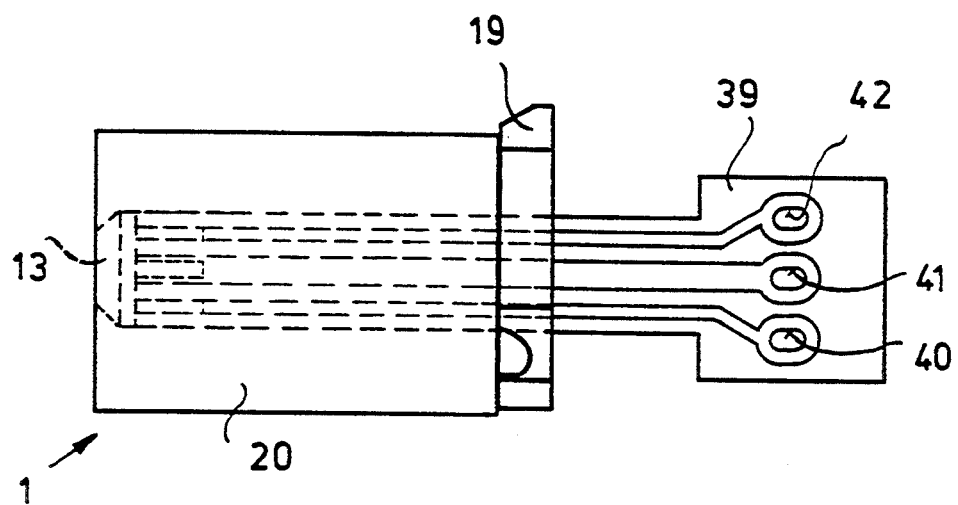
Figure 7B:
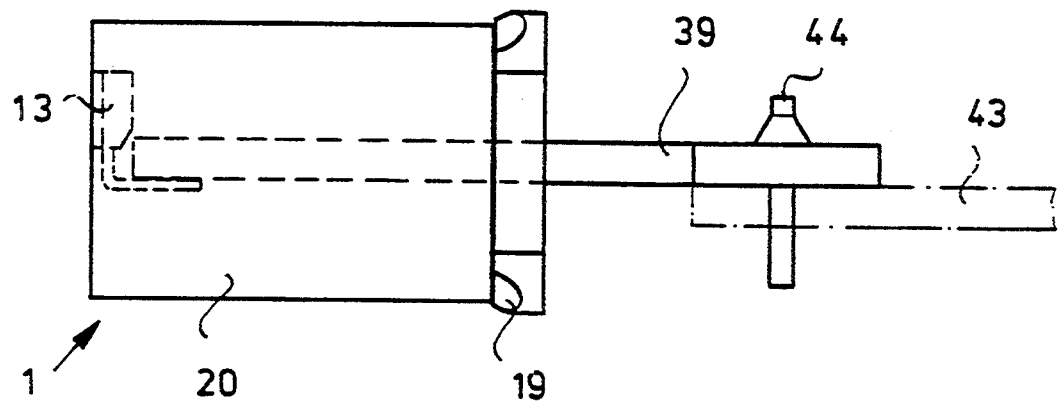
Figure 8A:
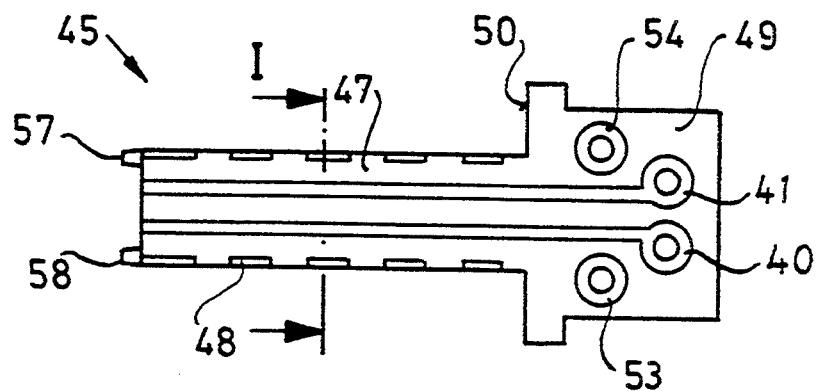
Figure 8B:
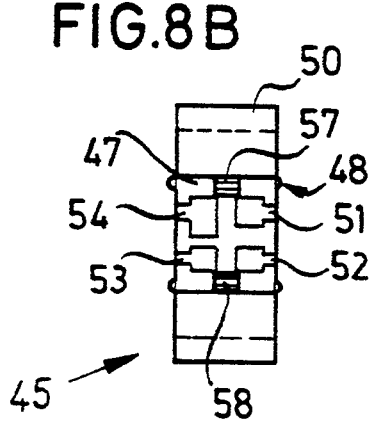
Figure 8C:
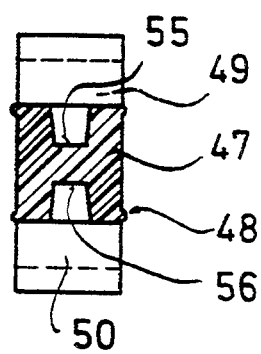
Figure 9:
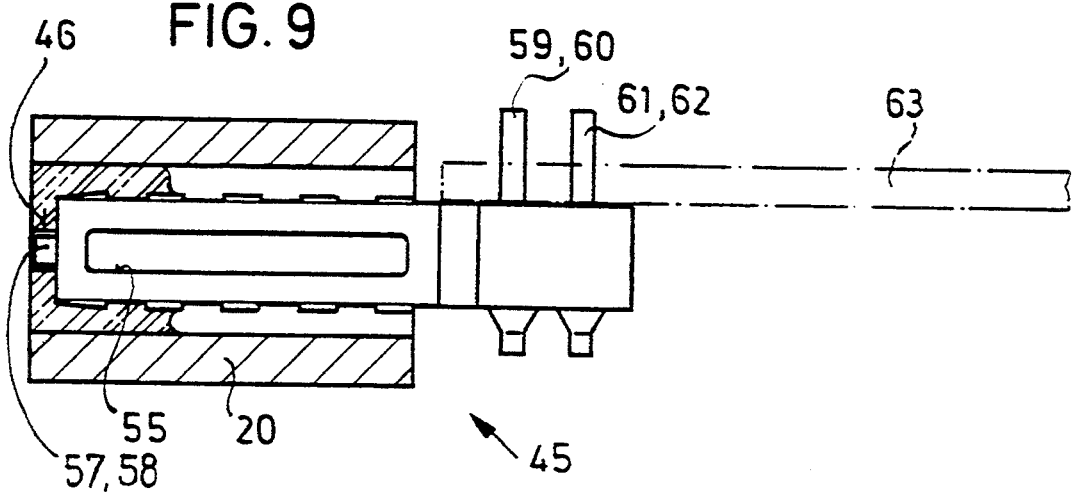

FIG. 2 illustrates a longitudinal section of a sensor head, configured at a printed circuit board and which also carries the electronics of the magnetic flux transmitter;

FIGS. 3A, 3B, 4A, 4B, 5A, 5B, 6A, and 6B illustrate plan views and side views of those components which form the sensor head of FIG. 2;

FIGS. 7A and 7B illustrate two views of a sensor head, which are of the printed circuit board type, and which are handleable as a finished structural component;

FIGS. 8A, 8B, and 8C illustrate a plan view, a side view, and a sectional view, respectively, of a parallelepiped-shaped carrier; and FIG. 9 illustrates a view, in section, of a sensor head with the carrier of FIGS. 8A, 8B, and 8C.

DESCRIPTION OF THE PREFERRED EMBODIMENT

FIG. 1 illustrates a sensor head for a magnetic flux transmitter which is the subject of the present invention and which sensor head is denoted generally by the reference numeral 1. The sensor head 1 is of the printed circuit board type and is inserted into the narrowed down extension 2 of a transmitter housing 3 of a magnetic flux transmitter 4 and is fastened therein by a suitable sealing compound 5.

A thread 6, which is configured at the transmitter housing 3, serves for fastening the magnetic flux transmitter 4, for example, at a gear box housing of a motor vehicle and with an interposition of a ring 7. At the transmitter housing 3 the ring 7 is retained so that it cannot be lost. The transmitter housing 3 is closed on the sensor end by a magnetically impermeable cover or cap 8, while a plug-in socket, which is serrated into the housing 3, is designated by the reference numeral 9, at which location a bayonet connection means 10 is configured for attachment of a union nut (not shown). A hexagon 11, which is molded to the transmitter housing 3, serves for applying a tool during the fastening of the magnetic flux transmitter 4 at the installation location.

In the component group illustrated in FIG. 2, one single printed circuit board constitutes the carrier 12 for the Hall generator 13 and for the conducting strips of the sensor head 1 as well as for the electronic components of the magnetic flux transmitter 4, which are not shown because they are not essential for the present invention. Four transmitter contacts, which are configured as knife or blade contacts, are designated by the reference numerals 14, 15, and 16, 17. The dash-dot line 18 indicates the plug-in socket 9 of FIG. 1, where the printed circuit board 12 and the knife or blade contacts 14, 15 and 16, 17, which penetrate to the outside, are retained. A clamping piece 19, which is pressed into the sleeve-shaped permanent magnet 20 of the sensor head 1, effects the desired close sliding fit between the carrier 12 and the permanent magnet 20. The clamping piece 19 is provided with flexural cheeks 21 and 22 which retain the clamping piece 19 in the sleeve-shaped permanent magnet 20. After adjustment, the sensor head 1 is permanently fastened by an adhesive material connection 23.

The assembly sequence is illustrated by the series of FIGS. 3A, 3B, 4A, 4B, 5A, 5B, 6A and 6B, which represent two views of the components which form the sensor head 1. FIGS. 3A and 3B show that the carrier is designed to be step-shaped in the direction of its longitudinal axis. The carrier has a finger-shaped extension 24 and which is preferably symmetrical to the longitudinal axis. The width of the extension 24 is smaller than the diameter of the aperture 25 of the permanent magnet 20. The conductive strips which are attached to the carrier 12, are designated by the reference numerals 26, 27 and 28.

During the course of the assembly of the sensor head 1, to begin with, the clamping piece 19, in whose flange 29 an aperture 30, which matches the extension 24, is configured, is slipped upon the extension 24. FIG. 4B illustrates a front view in the direction of the arrow in FIG. 4A. After that, the commercially available Hall generator 13, which in the embodiment illustrated in FIGS. 5A and 5B, has three poles, and the contact pins 31 of which are bent off in a suitable manner, is connected with the conducting strips or copper strips 26, 27, 28 in such a manner, that the Hall generator 13 is disposed, according to FIG. 2, at least partially and directly upstream of the end face of the extension 24 or that the contact pins 31 embrace the extension 24 on the end face.

Afterwards, the permanent magnet 20 is pressed upon the clamping piece 19.

The cheeks 21 and 22 are provided with the deformable ridges (not shown in the drawings) which serve for tolerance compensation. The permanent magnet 20 is pressed onto the clamping piece 19 which is mounted on the extension 24 and rests against a shoulder 24a acting as a stop. In this manner, the permanent magnet 20 is displaceably disposed upon the carrier 12, and the sensor head 1 can be adjusted by sliding the permanent magnet 20 to and over the Hall generator 13. For this purpose, the sensor head is electrically connected to a differential amplifier, the output signal of which, upon attaining the optimum working point with due regard to the interference influences, lies in a minimum range.

It should be noted for reasons of completeness, that the symmetrical design of the cheeks 21 and 22 of the clamping piece 19 serves for centering the sensor head 1 with respect to an already existing plug-in socket 9. In this manner, a symmetrical layout is also easily conceivable. The asymmetric layout requires, however, the providing, on the cheek 21, of distance lugs or spacer lugs 34, 35 which are supported on the cheek 21 and are separated from each other by an adjustable gap 32, with the spacer lug 35 being separated from the flange 29 of the clamping piece 19 by an adjustable gap 33. Further, the clamping piece 19 has radially-shaped centering extensions 36, 37, 38, which serve for radially aligning the sensor head 1, upon its introduction into the housing 3 or into the narrowed extension 2.

FIGS. 7A and 7B illustrate two views of the sensor head 1, wherein a carrier 39, which is in the form of a printed circuit board, is also provided, and upon which, the conducting strips which extend in the sensor head 1 and the Hall generator 13 are disposed. The conducting strips are terminated by contact areas, which respectively surround elongated holes 40, 41, 42 which are provided in the carrier. The sensor head 1 can, in this manner, be mechanically and electrically connected to a printed circuit board 43, which carries the electronic components of the magnetic flux transmitter. This connection can be effected by the use of contact pins 44 which fasten the printed circuit board 43 in the manner shown in FIG. 7B.

In this manner, there remains a certain adjustability in the longitudinal direction, in cooperation with the elongated holes 40, 41, 42, prior to establishing the final soldering connection. A conducting strap may also be used in the same manner providing for the advantage that the length adjustment, between a printed circuit board, which is allocated to the transmitter socket or exclusively the contacts of the transmitter sockets, and the sensor head, occurs automatically upon assembly.

As described above, the use of a carrier 45 according to FIGS. 8A, 8B, and 8C makes possible a direct connection with the permanent magnet 20 and the attachment of a Hall generator 46 directly at its end face. In order to assure the close sliding fit which is required for adjustment, even with the existing coarse tolerances, and in order to keep the area pressure low, sets of teeth, with one row of teeth designated by the reference numeral 48, are configured at the edges of the extension 47 which serve as the core of the sensor head 1, and which are more or less deformed when the permanent magnet 20 is slid on.

Notches may also be provided in the edges of the extension 47 and the diagonals of the extension cross-section may be made larger than the aperture diameter of the permanent magnet 20.

The rectangular-shaped carrier 45 has a widened stepped portion 49 defining a stop shoulder 50. The stop shoulder 50 has a surface area sufficient to provide for through-connection of conducting strips 51, 52, 53, 54 which are located in two planes. The widened portion 49 can also be used for mounting the carrier 45 in an assembly jig. The application of the conductive strips or tracks 51, 52, 53, 54 may occur by the serography process through laser contouring or by an injection molding attachment of the carrier 41 to a foil of the same material which carries the conductive strips 51, 52, 53, 54. It can also be noted from the sectional diagram of FIG. 8C, that a reduction in cross-section is provided by oppositely located depressions 55, and, thus, a certain flexibility of the extension 47 is assured. Protrusions, which are molded at the end faces at the extension 47, are designated by reference numerals 57 and 58. The protrusions 57 and 58 constitute a mounting for the Hall generator 46 which has been provided.

As is apparent from FIG. 9, a sensor head 1, which is formed by the carrier 45, can be connected in the same manner, meaning, by contact pins or coupling pins 59, 60 and 61, 62, for instance, to a printed circuit board 63, wherein suitable elongated holes are preferably configured in the printed circuit board 63 for length compensation.

While the present invention has been described in various preferred embodiments, such descriptions are merely illustrative of the present invention and are not to be construed as limitations thereof. In this regard, the present invention is meant to encompass all modifications, variations and/or alternate embodiments with the scope of the present invention limited only by the claims which follow.

What is claimed is:

1. A sensor head for a magnetic flux transmitter, comprising:
   a sleeve-shaped permanent magnet having an axis;
   a Hall generator associated with said permanent magnet and having an inductance axis;
   a carrier for supporting said Hall generator and provided with conductive strips for transmitting signals generated by said Hall generator, said carrier being received in an opening of said sleeve-shaped permanent magnet; and
   means for supporting said carrier in said opening without play in a position in which the inductance axis of said Hall generator and the axis of said permanent magnet coincide, and for insuring relative displacement of said permanent magnet and said carrier relative to each other for adjustment purposes;
   wherein said supporting means comprises a clamping piece insertable in said opening of said permanent magnet and having an aperture for receiving said carrier therein and flexural cheeks for retaining said carrier in said aperture and for slidably supporting said clamping piece in said opening of said permanent magnet; and wherein said carrier is formed as a printed circuit board.

2. The sensor head of claim 1, wherein said Hall generator has contact pins extending in a same direction and bent at right angles for embracing a portion of said carrier in vicinity of a free end face of said carrier for supporting said Hall generator on said carrier.

3. The sensor head of claim 1, wherein said carrier has a rectangular shape and a cross-sectional diagonal which is at least equal to a diameter of said opening of said permenent magnet, and further, wherein contact surfaces are provided on respective end faces of said carrier for contacting said Hall generator for connecting said Hall generator with said conductive strips on said carrier.

4. The sensor head of claim 3, wherein said carrier includes a holder for supporting said Hall generator at the end surface of said carrier.

5. The sensor head of claim 3, wherein said carrier includes a conductive strip carrying foil which is attached to said carrier by injection molding of said carrier to said foil.

6. The sensor head of claim 3, wherein said carrier includes a plurality of teeth provided on edges thereof and engageable with a wall defining said opening of said permanent magnet.

7. The sensor head of claim 5, wherein said foil has a length, which is greater than a length of said sensor head, and an end mechanically and electrically connected with a printed circuit board carrying electrical components of the magnetic flux transmitter.

8. The sensor head of claim 1, wherein said carrier has a first finger-shaped portion, which is at least partially received in said opening of said permanent magnet, and a second widened portion, said second widened portion having at an end of each conductive strip an oval hole which is contacted by an end of a respective strip.

9. The sensor head of claim 1, wherein said carrier forms a part of a printed circuit board carrying electrical components of the magnetic flux transmitter.

* * * * *

UNITED STATES PATENT AND TRADEMARK OFFICE
CERTIFICATE OF CORRECTION

PATENT NO. : 5,416,410
DATED : May 16, 1995
INVENTOR(S) : ERNST KASTLER

It is certified that error appears in the above-indentified patent and that said Letters Patent is hereby corrected as shown below:

On the title page, the assignee should read as follows:
[73] Assignee: MANNESMANN KIENZLE GMBH, Villingen, Germany Signed and Sealed this Second Day of April, 1996

Attest:

BRUCE LEHMAN

Attesting Officer      Commissioner of Patents and Trademarks